Feb. 24, 1942.          L. A. HERZIG           2,273,863
SOUND RECORD
Original Filed April 24, 1937
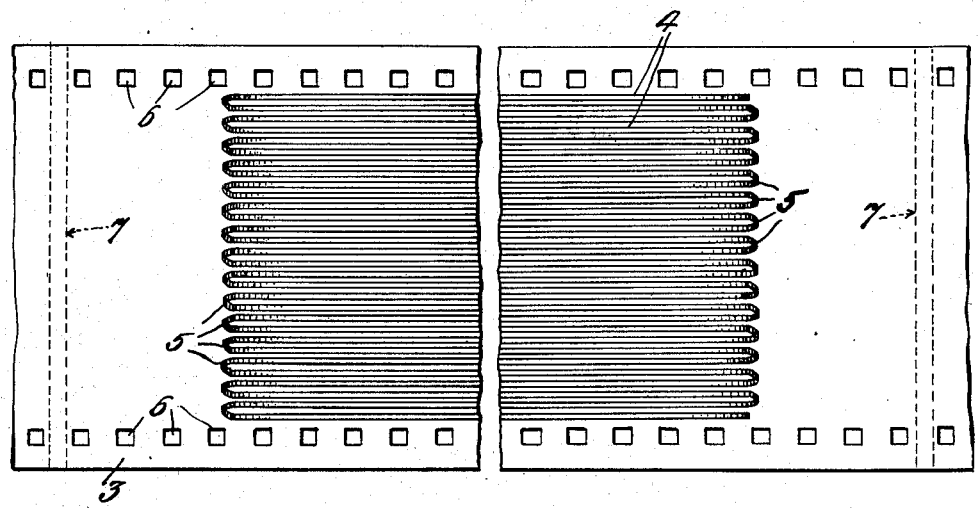
INVENTOR
Leonard A. Herzig
BY Eager & Malcolm
ATTORNEYS Patented Feb. 24, 1942

2,273,863

UNITED STATES PATENT OFFICE 2,273,863

SOUND RECORD

Leonard A. Herzig, Jackson Heights, N. Y., assignor to Len-Ga-Tone, Inc., New York, N. Y., a corporation of New York Original application April 24, 1937, Serial No. 138,751. Divided and this application April 30, 1940, Serial No. 332,443

3 Claims. (Cl. 274—41.6)

This invention relates to a photographic sound record and is a division of my copending application Serial No. 138,751, filed April 24, 1937, now Patent #2,215,468, issued September 24, 1940.

The objects of the invention are: to provide a new and improved photographic sound record; to provide a record in the form of a film having a plurality of parallel sound record tracks thereon which are adapted to be played successively without audible break or extraneous sound during the change-over from track to track; to provide a record of the foregoing type in which the successive tracks are played by moving the film first in one direction and then in the reverse direction, and are joined to each other by uniform loops forming parts of the sound tracks; and to provide a record of this type in which the loops connecting the sound tracks are exactly positioned and are all aligned in the same transvere section of the film.

The film of the present invention is particularly adapted for use in recording or reproducing sound for broadcasting purposes, for assemblies, for record libraries or for other purposes for which phonographs or film have heretofore been used. An important feature of the invention resides in the use of a comparatively short film containing a plurality of sound tracks which are played successively. A standard width 35 mm. film may, for example, have some thirty different sound tracks which are joined by loops so arranged that the scanning light of the reproducing apparatus follows the loops on the change-over without audible variation. In operation, the film is held on two reels and is fed first in one direction and then in the other for scanning each of the different connected tracks which constitute the sound record.

In the sound recording and reproducing apparatus of my above-mentioned Patent #2,215,468, with which the film of the present invention is adapted to be used, the film is fed past a sound gate by suitable means such as a pair of sprockets which are reversibly driven in unison. In said machine a pair of driveshafts having suitable vibration dampeners are continuously driven in opposite directions and an electrically operated clutch mechanism is provided to selectively connect the sprockets in driving relationship to the respective driveshafts. Due to the novel construction of my film, as hereinafter described, the mechanism is automatically operated by the film itself whenever the end of a sound track has been reached, or it may be operated manually. In the preferred embodiment, disclosed and claimed in said Patent #2,215,468, a sensitive and accurate control of the reversing mechanism is obtained by changing the grid potential of a space discharge tube by the capacity effect of a conducting bar or strip which is formed in or attached to the film adjacent the ends of the aligned loops of the sound tracks, the control being effected when the conducting strip reaches a predetermined point with respect to the sound gate.

These and other features and advantages of the invention will be described in connection with the accompanying drawing which is a plan view of a strip of film embodying said invention.

The film 3 itself may be of the usual type employed in motion pictures and is shown more in detail in the drawing as having a plurality of parallel photographic sound record tracks 4 which extend over substantially the entire length of the film and are joined at their ends by loops 5. The successive tracks are recorded with the film moving in opposite directions so that a continuous sound record is obtained by following the tracks in succession and reversing the film as the end of each track is reached. The film has the usual perforations 6 which cooperate with suitable teeth on the drive sprockets and is provided adjacent its two ends, at predetermined points with respect to the loops 5, with strips 7 of conducting material which may be sprayed or painted on the film or may be formed separately and attached thereto in any convenient way.

The conducting strips 7 are used for automatically reversing the film 3 in a manner described in my above-mentioned Patent #2,215,-468. It is to be understood that the film itself may be of any suitable or standard construction. The sound tracks 4, however, are all of exactly the same length and the loops 5 are aligned in the same transverse section of the film so that the scanning ray can be caused to exactly follow these loops on each reversal of the film. This exactness in the position of the various loops may be obtained by the control mechanism in my above-mentioned patent.

It will thus be seen that the film 3 has photographed thereon the various spaced parallel sound tracks 4 having interconnected ends, and that the said interconnected ends of successive sound tracks comprise the loops 5 forming a continuous photographic record adapted to be scanned without break or interruption. The said loops 5 at each end of the tracks 4 all lie in the same transverse section of the film and are of the same dimensions. The transverse strips 7 of conducting material extend across one face of the film 3 and are spaced longitudinally a predetermined distance from each of the loops 5, as previously described.

The invention claimed is:

1. A film having photographed thereon a plurality of spaced parallel sound tracks having interconnected ends, the interconnected ends of successive sound tracks comprising loops forming a continuous photographic record adapted to be scanned without break or interruption.

2. A film having photographed thereon a plurality of spaced parallel sound tracks having interconnected ends, the interconnected ends of successive sound tracks comprising loops forming a continuous photographic record adapted to be scanned without break or interruption, said loops at each end of said tracks all lying in the same transverse section of said film and being of the same dimensions.

3. A film having photographed thereon a plurality of spaced parallel sound tracks having interconnected ends, the interconnected ends of successive sound tracks comprising loops forming a continuous photographic record adapted to be scanned without break or interruption, and a transverse strip of conducting material extending across one face of said film and spaced longitudinally a predetermined distance from each of said loops.

LEONARD A. HERZIG.